Jan. 31, 1956  W. M. HARKS ET AL  2,732,976
DUAL LIQUID DISPENSER
Filed May 3, 1951  3 Sheets-Sheet 1

WALTER M. HARKS
JOHN J. DELANEY
INVENTOR.

BY Edmund W. E. Kamm
ATTORNEY

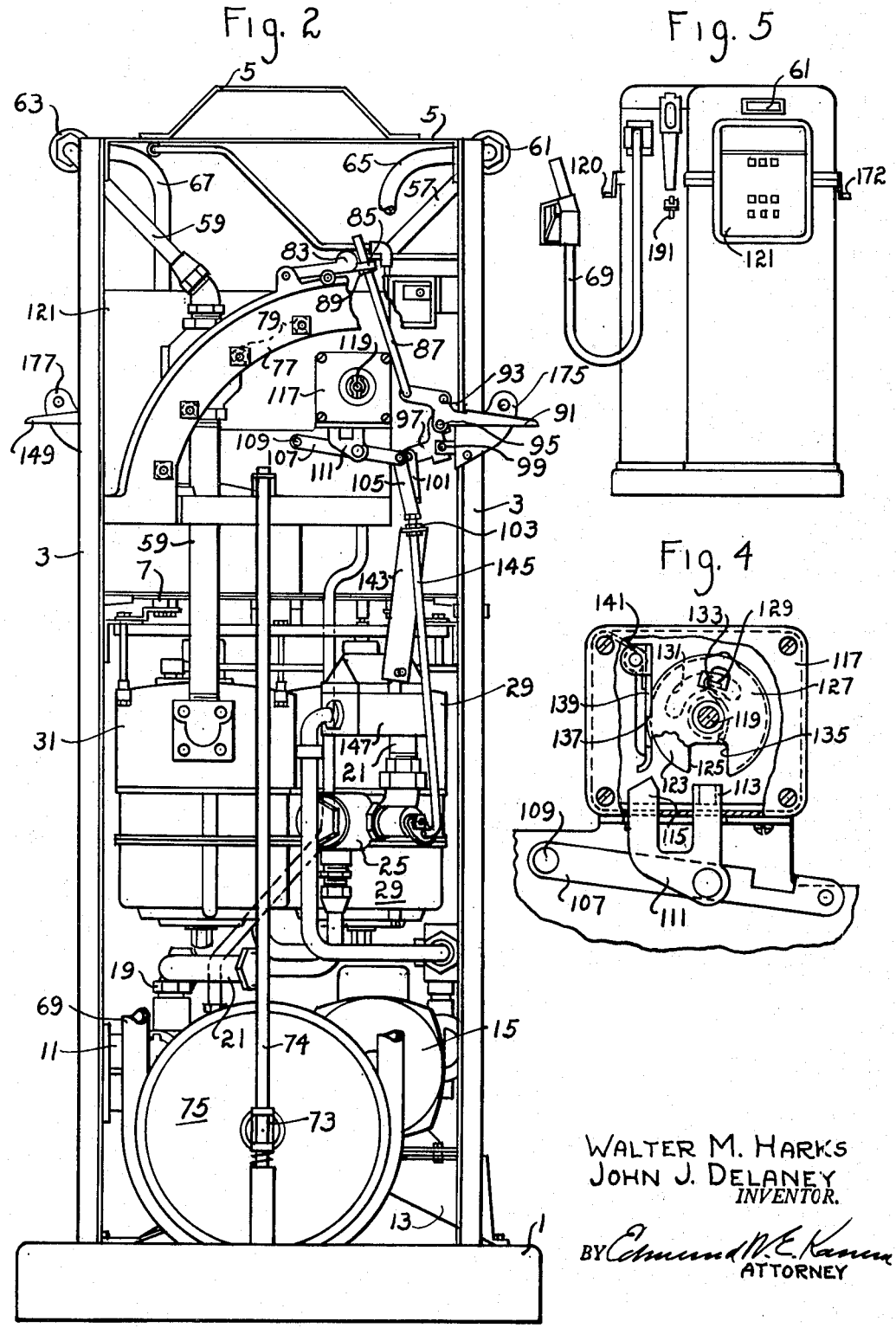

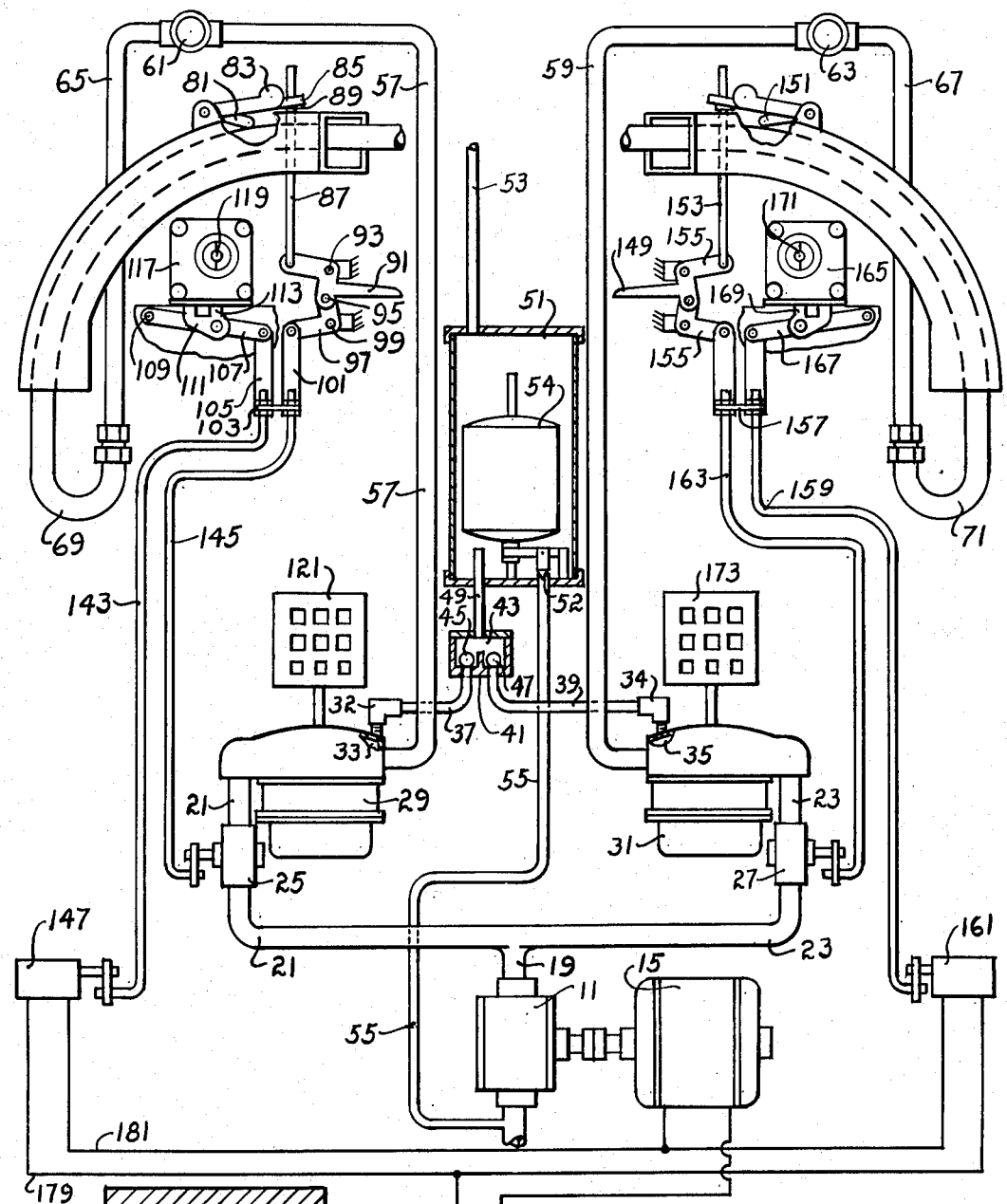
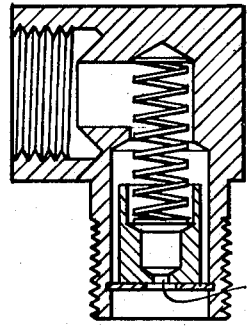

United States Patent Office 2,732,976
Patented Jan. 31, 1956

2,732,976
DUAL LIQUID DISPENSER

Walter M. Harks and John J. Delaney, Fort Wayne, Ind., assignors to Bowser, Inc., Fort Wayne, Ind., a corporation of Indiana Application May 3, 1951, Serial No. 224,384

15 Claims. (Cl. 222—26)

This invention relates to a dual liquid dispenser. More specifically, it relates to a liquid dispenser having a single pump and motor which serves either or both of two separate dispensing systems.

It is an object of the invention to provide a dual dispenser in which each system is separately controlled.

Another object of the invention is to provide a dual dispenser having a separate register for each dispensing system and a separate interlocking mechanism for each system to the end that dispensing through each system is prevented until the register for that system is properly zeroized.

A further object of the invention is to provide a dispenser having two dispensing systems branching from a single pump wherein valve means are provided for controlling the flow through each system.

Yet another object of the invention is to provide means for interlocking the valves in each branch with the register mechanism for that branch.

Still another object of the invention is to locate the controls for each dispensing hose at the end of the dispenser adjacent the hose.

Yet a further object of the invention is to provide means for preventing the operation of one meter, the register of which is not reset, while the other meter is operating.

A further object of the invention is to provide an air separation system having but one float chamber for the two dispensing systems.

Yet another object of the invention is to provide means for preventing the passage of liquid from one air separator to another.

Still a further object is to dispose the hose, control member, reset member and sight flow indicator adjacent the register which indicates the liquid being dispensed through the hose.

Another object is to segregate the register, hose and controls of one system on one side of the dispenser from those of the other system which are disposed on the opposite side of the dispenser.

Yet a further object of the invention is to dispose the hose and controls at the left side of the window through which the corresponding register is viewed so that in normal dispensing operation, the hose will not be drawn across the window so as to obscure the register.

These and other objects will become apparent from a study of this specification and the drawings which are attached hereto, made a part hereof and in which:

Figure 2 is an end elevation of the apparatus viewed from the right of Figure 1.

Figure 3 is a diagrammatic view of the apparatus showing the controls.

Figure 4 is a front elevation of the reset interlock mechanism.

Figure 5 is a front elevation of the dispenser with the housings in place, the opposite side presenting the same appearance.

Figure 6 is a sectional view of the air separator orifice.

Figure 1:
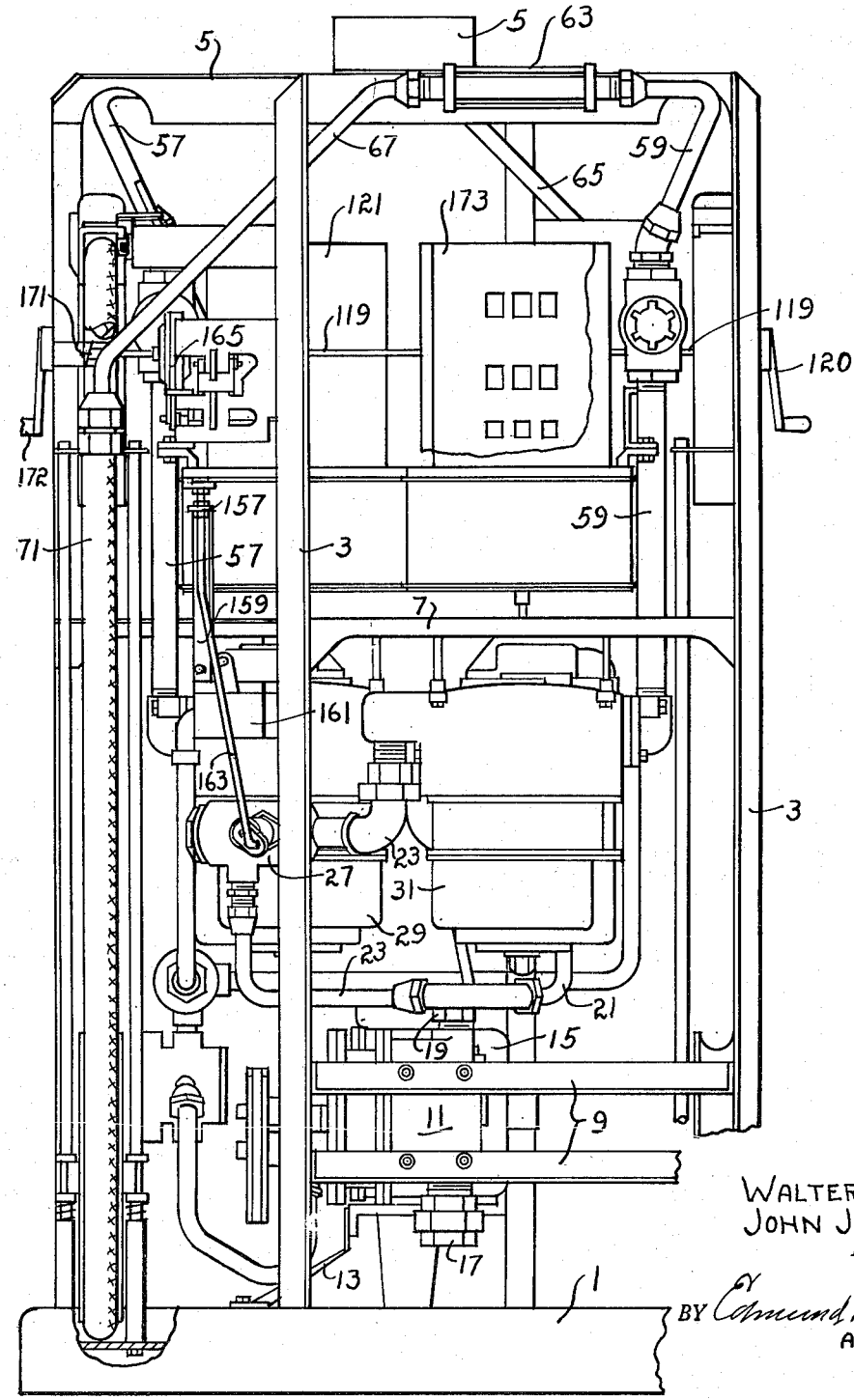
Figure 1 is a front elevation of the apparatus with the housings removed.

Referring first to Figures 1 and 2, the numeral 1 represents the base of the dispenser to which are fixed the upright frame members 3 which are joined together at the top by a canopy 5. A suitable transverse meter support 7 is joined to the members 3 and rails 9 support the pump 11. A suitable support 13 is fixed to the base for supporting the motor 15.

The numeral 17 represents the suction stub running to the pump. The outlet pipe 19 of the pump branches into lines 21, 23, which are connected through valves 25, 27 to the meters 29, 31.

Meters 29, 31 are of similar construction and each includes an air separation chamber 33, 35 from which the liquid enters the meter proper and the separated gas leaves through a restricted orifice 32, 34 and tube 37, 39. A valve body 41 has a central cavity 43 into which the tubes 37, 39 empty through the gravity operated ball check valves 45, 47 which open into the cavity. A discharge tube 49 connects the chamber with a float chamber 51 which has an air vent 53 which connects the top thereof with atmosphere and a liquid drain which is connected by tube 55 to the suction side of the pump. The valve 52 which is operated by float 54 controls this connection.

The outlets 57, 59 from the meters are connected with the transparent conduit sections 61, 63, which in turn are connected by pipes 65, 67 with their respective hoses 69, 71. The latter are fitted with the usual nozzles (not shown).

A hose retrieving mechanism is provided for each hose which comprises a member 73, slidably mounted on a vertical rod 74, which rotatably supports a sheave 75. The hose 69 runs downwardly from pipe 65 around the sheave, upwardly and laterally through guide 77 which is fitted with rolls 79 and out through the housing. A brake 81 is pivotally mounted on guide 77 and is urged in a clockwise direction (Figure 3) by the weighted arm 83 so as to be pressed against the hose. A projection 85 on the arm is perforated and slidably receives a rod 87 which has a collar 89 disposed under the projection. The other end of the rod is pivotally connected to the control lever 91 which is pivotally mounted at 93 on the frame.

Control lever 91 has pivotally connected to it at 95, one arm of a bell crank 97 which is pivotally mounted on the frame at 99 and the other arm of which is pivotally connected to a rigid arm 101 of a cross-head 103. The latter has a second rigid arm 105 which is pivotally connected to a lever 107 pivotally mounted at 109 on the frame. The lever carries, pivotally mounted thereon, intermediate its ends, a member 111 which has two prongs 113, 115 (Figure 4).

An interlock housing 117 is fixed to the frame and the shaft 119 for resetting the register 121 passes through it. A disc 123 is fixed to the shaft and has a notch 125 therein to receive the seeker prong 113. A second disc 127 is freely mounted on the shaft and has an ear 129 bent toward the first disc which rides in a slot 131 in disc 123. A spring 133 is fixed to disc 123 and bears on ear 129 to rotate the latter clockwise (Figure 4) relative to disc 123.

Disc 127 also has a notch 135 adapted to receive the seeker 113. It also has a tooth 137 which is adapted to be engaged by a pawl 139 which is pivotally mounted on the housing and is urged into contact with the disc by a spring 141. The tooth is so related to notch 135 that when the tooth engages the pawl, notch 135 will be aligned with notch 125 and seeker 113.

The notches are slightly wider than the seeker. Thus, when the cam prong 115 cams pawl 139 away from the tooth, the disc 127 will be rotated far enough by the spring to prevent reengagement of the pawl and tooth, the rotation being limited by contact of the disc 127 with the seeker. However, when the seeker is withdrawn the disc 127 will be further rotated to close the notch 125 and prevent the seeker from again being raised.

The register shaft 119 is rotated manually by a crank 120 in a counter-clockwise direction (Figure 4) some 390 degrees. This carries the tooth 137 slightly beyond pawl 137. The shaft is then rotated reversely by yieldable means in the register, a distance of about 30 degrees. The disc 127 is stopped almost immediately by the pawl and the notch 135 is aligned with the seeker 113. Disc 123 continues to rotate reversely with the shaft so that spring 133 is wound. At the end of the reverse rotation, the notch 125 is also aligned with the seeker 113 so that the latter may be raised again.

The associated register 121 has been reset by the shaft so that it indicates a zero reading.

Thus it will be seen from Figures 2 and 3 that when the register has been reset as described, the control lever 91 may be rotated counterclockwise to raise the crosshead 103 which in turn raises the lever 107, the seeker 113 and cam prong 115 to trip the pawl 139 as described.

The cross-head raises the links 143 and 145 which close the switch 147 and open the valve 25. Lever 91 also lowers rod 87 so that the brake 81 is brought to bear on the hose.

A similar interlocking mechanism is provided for the other branch dispensing system and comprises the control lever 149, brake 151, brake rod 153, bell crank 155, cross-head 157, switch rod 159, switch 161, valve rod 163, valve 27, interlock housing, lever 167, seeker 169 and reset shaft 171 which has a crank 172 and which operates the register 173.

The hose nozzle of each hose is adapted to be supported on the hose hook 175, 177 only when the associated control lever is in the lowermost position as shown in Figures 2 and 3, as is common practice.

The switches 147, 161 are connected in parallel between one side 179 of the main and the motor 15 while the other main 181 runs directly to the motor, thus when either or both of the switches are closed, the motor will operate.

Operation

Assuming that the parts occupy the positions shown in Figures 3 and 4, an operator desiring to dispense gasoline will first reset the particular register which he desires to use, for example 121, by operating the crank 120. This zeroizes the indicators of the register and sets the notches 125, 135 of the interlock discs into alignment with the seeker 113.

He will then remove the nozzle from the hose hook 175 and raise the control lever 91.

The lever 149 will not be freed for operation until its associated crank 172 is rotated to reset the register 173.

Operation of lever 91 engages the brake 81 with the hose, opens the valve 25 and closes the switch 147 to start the motor. The operator will then withdraw the required length of hose 69 which will be held extended by the brake 81. When the nozzle valve is opened dispensing will be effected in the usual manner.

While dispensing is proceeding, another operator may reset the register 173 by means of crank 172 and raise lever 149 to engage brake 151, open valve 27 and close switch 161. He will then withdraw the required length of hose 71 which is held extended by the brake 151 and open the nozzle valve.

The effect of bringing the second system into action is merely that of reducing the flow through the first system somewhat. The flow through either hose when used separately is on the order of 15.5 G. P. M. with the nozzle valve wide open while the flow through each hose when both systems are in operation is of the order of 9.8 G. P. M. making a total of 19.6 G. P. M.

Each system operates its own register which is on the side of the dispenser from which the associated hose issues so that there is little chance of the wrong register indication being taken in any transaction.

When either operator completes the dispensing he will depress the control lever 91, 149. This opens the associated switch, closes the associated valve, withdraws the seeker from the interlock and lifts the associated hose brake so that the hose will be retrieved by the retraction mechanism.

The passage of liquid from one air separator chamber 33, 35 to the other, when the one system is being operated with the other idle, is prevented by the check valves 45, 47. If these valves were omitted it would be possible, under certain conditions to draw gasoline from the hose of the idle system at rates of as high as 1 G. P. M. by merely opening the hose nozzle and without resetting the associated register or opening the associated line valve 25 or 27. The customer being served through the operating system would not be cheated because the gasoline thus diverted has not been measured by the meter in that system.

It is obvious that various changes may be made in the form, structure and arrangement of parts without departing from the spirit of the invention. Accordingly, applicants do not desire to be limited to the specific embodiment disclosed herein primarily for purposes of illustration but instead, they desire protection falling fairly within the scope of the appended claims.

What we claim to be new and desire to protect by Letters Patent of the United States is:

1. In a dual dispensing apparatus comprising a single frame and housing, the combination of a pump having a suction and a branched discharge line, a motor for driving the pump, a dispensing system comprising a valve, a separator, a meter and a discharge hose connected to each branch, a resettable register connected to be driven by each meter, a switch for each system, said switches being connected in parallel to control the motor, a control lever and an interlock mechanism for each system and means for connecting the control lever of each system for operating the switch and valve, said interlock mechanism and connecting means serving to prevent the operation of the control means for opening the valve and closing the switch when the register of said system has not been zeroized.

2. In a dual dispensing apparatus comprising a single frame and housing, the combination of a pump having a suction and a branched discharge line, a motor for driving the pump, a dispensing system comprising a valve, a separator, a meter and a discharge hose connected to each branch, a resettable register connected to be driven by each meter, a switch for each system, said switches being connected in parallel to control the motor, a control lever and an interlock mechanism for each system and means connecting the control lever of each system for operating the switch and valve, said interlock mechanism and connecting means serving to prevent the operation of the control means for opening the valve and closing the switch when the register of said system has not been zeroized, means for zeroizing said register and means operable by said zeroizing means for disabling said interlock mechanism.

3. In a dispensing apparatus, the combination of a pump having a suction and a branched discharge line, a motor for driving the pump, a dispensing system comprising a valve, a separator, a meter and a discharge hose connected to each branch, a resettable register connected to be driven by each meter, a switch for each system, said switches being connected in parallel to control the motor, a control lever and an interlock mechanism for each system and means connecting the control lever of each system for operating the switch and valve, said interlock mechanism and connecting means serving to prevent the operation of the control means for opening the valve and closing the switch when the register of said system has not been zeroized, hose braking means for each hose, and means operable by the associated control means for moving said braking means to and from braking position.

4. In a dual dispensing apparatus having a frame, a housing for the apparatus, a pump and motor therefor mounted on the frame, a branched outlet from the pump, a dispensing system connected to each branch, comprising an air separator, a meter, a resettable register connected to the meter, a hose, a hose storing device in the housing, a control lever, means connecting the lever to start and stop the motor and a reset crank for the register, means for mounting the registers of the two systems adjacent opposed sides of the apparatus, means for supporting each of the control levers and reset cranks for the associated register adjacent said register and on the same side of the apparatus housing, and means for guiding the hoses to issue from the side of the apparatus adjacent the associated registers, reset cranks and control levers.

5. In a dual dispensing apparatus having a frame, a housing for the apparatus, a pump and motor therefor mounted on the frame, a branched outlet from the pump, a dispensing system connected to each branch, comprising an air separator, a meter, a resettable register connected to the meter, a flow sight, a hose, a control lever, means connecting the lever to start and stop the motor and a reset crank for the register, means for mounting the registers of the two systems adjacent opposed sides of the apparatus, means for supporting each of the control levers, flow sights and reset cranks for the associated register adjacent said register and on the same side of the apparatus, and means for connecting the hoses to issue from the side of the apparatus housing adjacent the associated registers, reset cranks and control levers.

6. In a unitary dispensing apparatus having a single frame and housing, a pump and a motor therefor mounted in the frame, said pump having a branched discharge line, a valve and dispensing means, including a resettable register, connected with each branch, a pair of switches connected in parallel to control said motor, a control lever for each dispensing means and an interlocking mechanism for each lever, means connecting each control lever to operate its associated valve and switch, resetting means for each register, means connecting said resetting means to clear the associated interlock whereby said associated control lever is freed for operation.

7. In a dispensing apparatus the combination of a pump, an electric motor therefor, a branched discharge line from the pump, a dispensing system including an air separator disposed in each branch, said separators each having a combined gas and liquid discharge conduit connected thereto, means connecting said conduits to discharge into a single tube, a float chamber connected to said single tube, a liquid drain and an air vent connected with said chamber, said drain being connected with the suction side of the pump, a float and a float operated valve in said chamber for controlling said drain.

8. In a dispensing apparatus the combination of a pump, an electric motor therefor, a branched discharge line from the pump, a dispensing system including an air separator disposed in each branch, said separators each having a combined gas and liquid discharge conduit connected thereto, means connecting said conduits to discharge into a single tube, a float chamber connected to said single tube, a liquid drain and an air vent connected with said chamber, said drain being connected with the suction side of the pump, a float and a float operated valve in said chamber for controlling said drain and a check valve in each of said gas and liquid conduits.

9. In a dispensing apparatus the combination of a pump, an electric motor therefor, a branched discharge line from the pump, a dispensing system including an air separator disposed in each branch, said separators each having a combined gas and liquid discharge conduit connected thereto, means connecting said conduits to discharge into a single tube, a float chamber connected to said single tube, a liquid drain and an air vent connected with said chamber, said drain being connected with the suction side of the pump, a float and a float operated valve in said chamber for controlling said drain, and a check valve in each of said gas and liquid conduits, said valves being disposed to prevent flow from one of said conduits into the other.

10. In a dispensing apparatus the combination of a pump, an electric motor therefor, a branched discharge line from the pump, a dispensing system including an air separator disposed in each branch, said separators each having a combined gas and liquid discharge conduit connected thereto, means connecting said conduits to discharge into a single tube, a float chamber connected to said single tube, a liquid drain and an air vent connected with said chamber, said drain being connected with the suction side of the pump, a float and a float operated valve in said chamber for controlling said drain, and a check valve in each of said gas and liquid conduits, said valves being disposed to close toward said separators to prevent flow from one of said conduits into the other.

11. In a dispensing apparatus having a frame, a pump and a motor therefor mounted on the frame, a branched outlet on the pump, a housing on the apparatus, a dispensing system connected to each branch and comprising a meter, a discharge line including a hose, a resettable registering mechanism, means including a control member for starting and stopping the flow of liquid through the system and means for resetting the registers, a window in each of two opposite sides of the housing, means for mounting the registers one adjacent each window, means for mounting the control means and resetting means of each system on the frame to project through the housing adjacent the window of the corresponding register and means on the frame for guiding the hose of each system through the housing adjacent the window of the corresponding register.

12. In a dispensing apparatus having a frame, a pump and a motor therefor mounted on the frame, a branched outlet on the pump, a housing on the apparatus, a dispensing system connected to each branch and comprising a meter, a discharge line including a hose, a resettable registering mechanism, means including a control member for starting and stopping the flow of liquid through the system and means for resetting the registers, a window in each of two opposite sides of the housing, means for mounting the registers one adjacent each window, means for mounting the control means and resetting means of each system on the frame to project through the housing adjacent the window of the corresponding register and means on the frame for guiding the hose of each system through the housing adjacent the window of the corresponding register, and hose retrieving means for each hose, disposed in said housing.

13. In a dispensing apparatus having a frame, a pump and a motor therefor mounted on the frame, a branched outlet on the pump, a housing on the apparatus, a dispensing system connected to each branch and comprising a meter, a discharge line including a sight flow indicator, a hose, a resettable registering mechanism, means including a control member for starting and stopping the flow of liquid through the system and means for resetting the registers, a window in each of two opposite sides of the housing, means for mounting the registers one adjacent each window, means for mounting said sight flow indicator adjacent the corresponding register within the window, so as to be visible therethrough, means for mounting the control means and resetting means of each system on the frame to project through the housing adjacent the window of the corresponding register and means on the frame for guiding the hose of each system through the housing adjacent the window of the corresponding register.

14. In a dispensing apparatus having a frame, a pump and a motor therefor mounted on the frame, a branched outlet on the pump, a housing on the apparatus, a dispensing system connected to each branch and comprising a meter, a discharge line including a hose, a resettable registering mechanism, means including a control member for starting and stopping the flow of liquid through the system and means for resetting the registers, a window in each of two opposite sides of the housing, means for mounting the registers one adjacent each window, means for mounting the control means and resetting means of each system on the frame to project through the housing adjacent the left side of such window as it is viewed, and means on the frame for guiding the hose of each system through the housing adjacent the window of the corresponding register.

15. A dual gasoline dispensing apparatus comprising, in combination, a pump having an inlet and an outlet line, a motor for driving the pump, a first meter having a resettable register communicating with the pump outlet line, a first discharge hose communicating with the first meter, first control means including a motor switch associated with the first meter and register for starting and stopping the motor, a second meter having a resettable register communicating with the pump outlet line, a second discharge hose communicating with the second meter, second control means including a motor switch associated with the second meter and register for starting and stopping the motor and means including an air separator connected to each meter for venting vapor and returning the liquid which accumulates in the separator to the pump suction line.

References Cited in the file of this patent

UNITED STATES PATENTS

| | | |
|---|---|---|
| 1,612,424 | Farr | Dec. 28, 1926 |
| 1,696,738 | Stedwell | Dec. 25, 1928 |
| 1,816,901 | Grise | Aug. 4, 1931 |
| 1,855,667 | Davis | Apr. 26, 1932 |
| 1,969,024 | Miano | Aug. 7, 1934 |
| 2,008,460 | McCandless | July 16, 1935 |
| 2,022,932 | DeLancey | Dec. 3, 1935 |
| 2,225,271 | Hope | Dec. 17, 1940 |
| 2,345,338 | Goldberg | Mar. 28, 1944 |
| 2,356,273 | Risser | Aug. 22, 1944 |
| 2,413,036 | DeLancey | Dec. 24, 1946 |
| 2,552,886 | Damon | May 15, 1951 |
| 2,652,948 | Moore et al. | Sept. 22, 1953 |